US011867858B2

(12) United States Patent
Kuwamori (10) Patent No.: US 11,867,858 B2
(45) Date of Patent: Jan. 9, 2024

(54) SEISMIC OBSERVATION DEVICE, SEISMIC OBSERVATION METHOD, AND RECORDING MEDIUM (71) Applicant: NEC Corporation, Tokyo (JP)

(72) Inventor: Naoki Kuwamori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/635,070

(22) PCT Filed: Aug. 5, 2020

(86) PCT No.: PCT/JP2020/030015
§ 371 (c)(1),
(2) Date: Feb. 14, 2022

(87) PCT Pub. No.: WO2021/033547
PCT Pub. Date: Feb. 25, 2021

(65) Prior Publication Data
US 2022/0291409 A1 Sep. 15, 2022

(30) Foreign Application Priority Data
Aug. 20, 2019 (JP) .................................. 2019-150624

(51) Int. Cl.
G01V 1/30 (2006.01)
G01V 1/00 (2006.01)

(52) U.S. Cl.
CPC .............. G01V 1/307 (2013.01); G01V 1/008 (2013.01); G01V 2210/63 (2013.01)

(58) Field of Classification Search
CPC ...... G01V 1/307; G01V 1/008; G01V 2210/63
See application file for complete search history.

(56) References Cited

U.S. PATENT DOCUMENTS 9,366,770 B2 * 6/2016 Kachi ................... G01V 1/008
2014/0039800 A1 * 2/2014 Kikuchi ................ G01V 1/008
702/15

FOREIGN PATENT DOCUMENTS

| JP | 2006-112999 A | 4/2006 |
| JP | 2014-169960 A | 9/2014 |
| JP | 2014-215208 A | 11/2014 |
| JP | 2015-215221 A | 12/2015 |
| TW | 201310053 A | 3/2013 |

(Continued)

OTHER PUBLICATIONS

Weebly, "Earthquake P-wave and S-wave Travel Time", 2008, Melon Earth Science Publisher, pp. 108-113 (Year: 2008).*

(Continued)

Primary Examiner — Elias Desta
(74) Attorney, Agent, or Firm — Sughrue Mion, PLLC (57) ABSTRACT A seismic observation device includes: a waveform acquisition unit that acquires waveform data for a predetermined period including an observation start time of a P wave; a delay time specifying unit that inputs the waveform data to a trained model and acquires, from the trained model, a delay time from the observation start time of the P wave to an observation start time of an S wave; and an observation time estimation unit that estimates the observation start time of the S wave based on the observation start time of the P wave and the delay time.

4 Claims, 6 Drawing Sheets (56) References Cited

FOREIGN PATENT DOCUMENTS

WO    2018/008708 A1    1/2018

OTHER PUBLICATIONS

International Search Report for PCT Application No. PCT/JP2020/030015, dated Oct. 20, 2020.
S. Gentili et al., "Automatic picking of P and S phases using a neural tree", Journal of Seismology (2006), 10, pp. 39-63.
Japan Meteorological Agency Earthquake and Volcano Department, "Technical reference materials on the outline andprocessing method of Earthquake Early Warning", Dec. 13, 2016, pp. 1-18.
Taiwanese Office Action for TW Application No. 109127172, dated Oct. 5, 2022 with English Translation.

* cited by examiner

SEISMIC OBSERVATION DEVICE, SEISMIC OBSERVATION METHOD, AND RECORDING MEDIUM

This application is a National Stage Entry of PCT/JP2020/030015 filed on Aug. 5, 2020, which claims priority from Japanese Patent Application 2019-150624 filed on Aug. 20, 2019, the contents of all of which are incorporated herein by reference, in their entirety.

TECHNICAL FIELD

The present invention relates to a seismic observation device, a seismic observation method, and a recording medium.

BACKGROUND ART

When a large-scale earthquake occurs, it is desired to report the occurrence of the earthquake as soon as possible. In response to such a request, for example, in Japan, a system that reports an Earthquake Early Warning via television broadcasting, mobile communication, or the like when it is determined that a large-scale earthquake has occurred, based on a seismic wave has been constructed.

Patent Document 1 discloses, as a related technique, a technique for implementing the B-Δ method used to analyze a seismic wave analysis by machine learning.

PRIOR ART DOCUMENTS

Patent Documents

Patent Document 1: PCT International Publication No. WO2018/008708

SUMMARY OF THE INVENTION

Problem to be Solved by the Invention

In order to report the occurrence of an earthquake as soon as possible, it is necessary to quickly specify an observation start time of a P wave (primary wave, pressure wave) and an observation start time of an S wave (secondary wave, share wave) at an observation point of a seismic wave and to specify the seismic center of the earthquake.

Then, there is a demand for a technique capable of quickly specifying the observation start time of the S wave which having a technical difficulty in being specified.

An example object of each example aspect of the present invention is to provide a seismic observation device, a seismic observation method, and a recording medium capable of solving the above problem.

Means for Solving the Problem

According to one example aspect of the present invention, a seismic observation device includes: a waveform acquisition means for acquiring waveform data for a predetermined period including an observation start time of a P wave; a delay time specifying means for inputting the waveform data to a trained model and acquiring, from the trained model, a delay time from the observation start time of the P wave to an observation start time of an S wave; and an observation time estimation means for estimating the observation start time of the S wave based on the observation start time of the P wave and the delay time.

According to one example aspect of the present invention, a seismic observation method includes: acquiring waveform data for a predetermined period including an observation start time of a P wave; inputting the waveform data to a trained model and acquiring, from the trained model, a delay time from the observation start time of the P wave to an observation start time of an S wave; and estimating the observation start time of the S wave based on the observation start time of the P wave and the delay time.

According to one example aspect of the present invention, a recording medium stores a program for causing a computer to execute: acquiring waveform data for a predetermined period including an observation start time of a P wave; inputting the waveform data to a trained model and acquiring, from the trained model, a delay time from the observation start time of the P wave to an observation start time of an S wave; and estimating the observation start time of the S wave based on the observation start time of the P wave and the delay time.

According to one example aspect of the present invention, a recording medium stores a configuration program for causing each of: a waveform acquisition means for acquiring waveform data for a predetermined period including an observation start time of a P wave; a delay time specifying means for inputting the waveform data to a trained model and acquiring, from the trained model, a delay time from the observation start time of the P wave to an observation start time of an S wave; and an observation time estimation means for estimating the observation start time of the S wave based on the observation start time of the P wave and the delay time, to be configured as hardware.

Effect of Invention

According to each example aspect of the present invention, it is possible to quickly specify an observation start time of an S wave.

EXAMPLE EMBODIMENT

Hereinafter, example embodiments will be described in detail with reference to the drawings.

Example Embodiment

A seismic observation system 1 according to an example embodiment of the present invention is a system that estimates an observation start time of an S wave (time at which an observation of an S wave is started) by using a trained model in which a delay time from the observation start time of the P wave (time at which an observation of a P wave is started) to an observation start time of an S wave included in the seismic wave (time at which an observation of the S wave is started) is learned while using, as an input, waveform data for a predetermined period including an observation start time of a P wave included in a seismic wave. The seismic wave is generated by an earthquake and shows, in time series, tremor at an observation point when the tremor at the seismic center of the earthquake is propagated to the observation point (for example, the position at which a seismic detection device 10 described later is installed). The P wave refers to a seismic wave that first reaches the observation point when an earthquake occurs, and to a wave showing preliminary tremors. The S wave refers to a seismic wave that reaches the observation point following the P wave when the earthquake occurs, and to a wave showing a large tremor called a large tremor.

Figure 1:
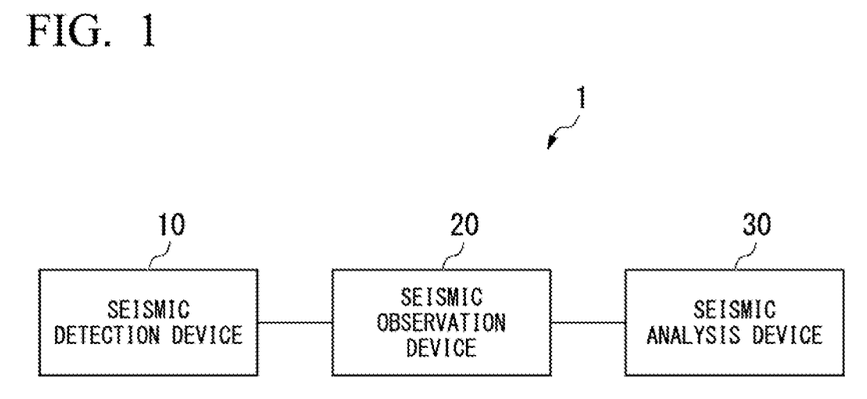
FIG. 1 is a diagram showing an example of a configuration of a seismic observation system according to an example embodiment of the present invention.

As shown in FIG. 1, the seismic observation system 1 includes a seismic detection device 10, a seismic observation device 20, and a seismic analysis device 30.

The seismic detection device 10 is a device that detects seismic waves. The seismic observation device 20 is a device that measures a P wave and an S wave. The seismic observation device 20 estimates an observation start time of an S wave by using a trained model in which a delay time (time difference) from an observation start time of a P wave to the observation start time of the S wave is trained while using, as an input, a seismic wave detected by the seismic detection device 10. The seismic analysis device 30 is a device that analyzes an earthquake by using measurement data of the P wave and S wave measured by the seismic observation device 20.

Figure 2:
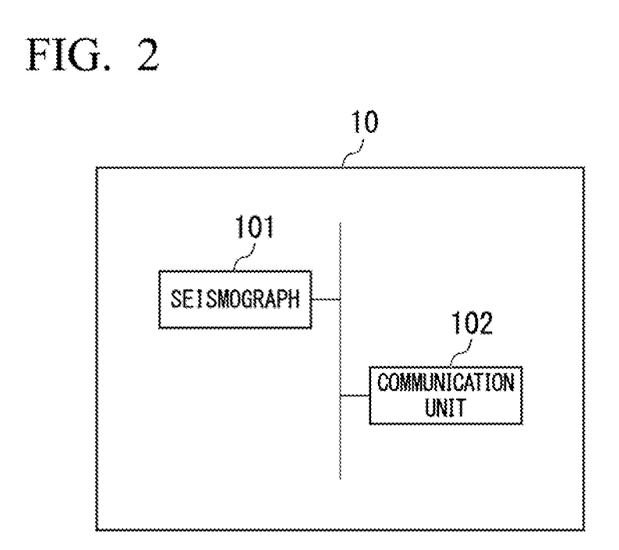
FIG. 2 is a diagram showing an example of a configuration of a seismic detection device according to the example embodiment of the present invention.

As shown in FIG. 2, the seismic detection device 10 includes a seismograph 101 and a communication unit 102.

The seismograph 101 detects seismic waves.

The communication unit 102 communicates with the seismic observation device 20. For example, the communication unit 102 transmits a seismic wave detected by the seismograph 101 to the seismic observation device 20.

Figure 3:
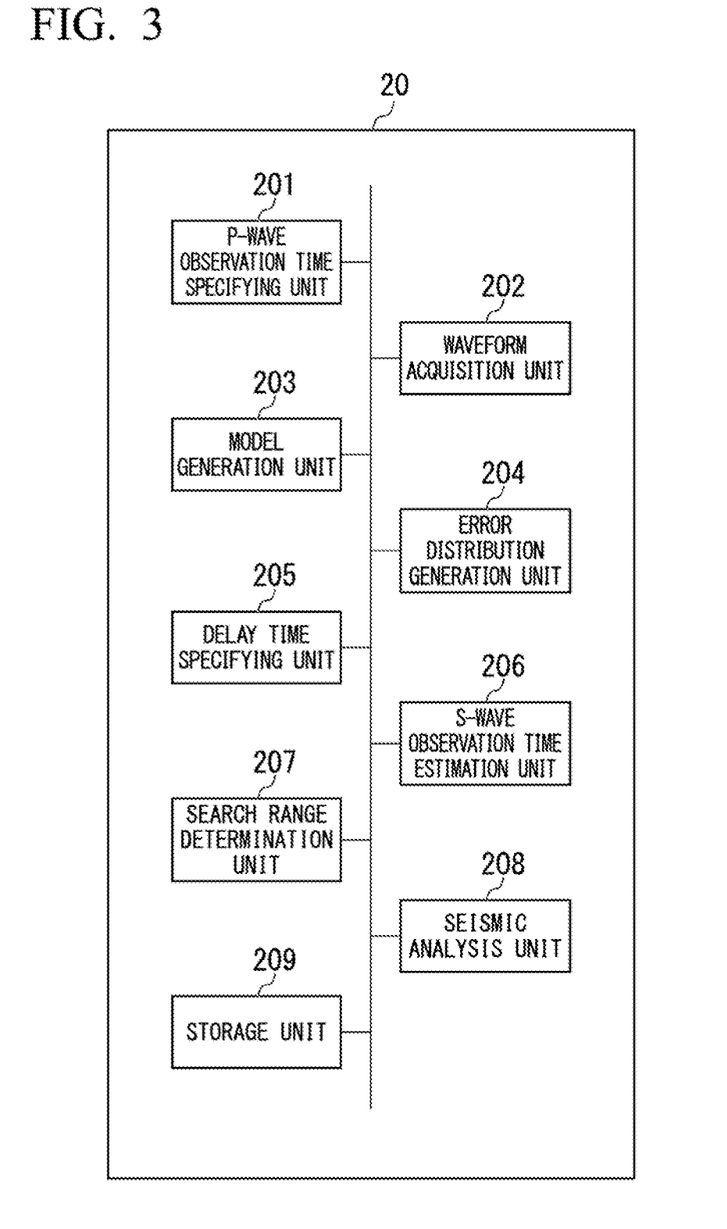
FIG. 3 is a diagram showing an example of a configuration of a seismic observation device according to the example embodiment of the present invention.

As shown in FIG. 3, the seismic observation device 20 includes a P-wave observation time specifying unit 201, a waveform acquisition unit 202, a model generation unit 203, an error distribution generation unit 204, a delay time specifying unit 205, and an S-wave observation time estimation unit (an example of an observation time estimation unit) 206, a search range determination unit 207, a seismic analysis unit (an example of an observation time specifying unit) 208, and a storage unit 209.

The P-wave observation time specifying unit 201 specifies the observation start time of a P wave by using waveform data of a seismic wave, which is acquired from the waveform acquisition unit 202.

For example, the P-wave observation time specifying unit 201 determines whether or not the amplitude of a seismic wave indicated by the waveform data exceeds the amplitude being 10 times the noise level set in advance. The amplitude being 10 times the noise level described here is an example of a set value (threshold value). The set value may be set to any value.

When the P-wave observation time specifying unit 201 determines that the amplitude of the seismic wave indicated by the waveform data does not exceed the amplitude being 10 times the preset noise level, the P-wave observation time specifying unit 201 performs the above determination again.

When the P-wave observation time specifying unit 201 determines that the amplitude of the seismic wave indicated by the waveform data exceeds the amplitude being 10 times the noise level set in advance, the P-wave observation time specifying unit 201 specifies a time at which the amplitude of the seismic wave indicated by the waveform data exceeds the noise level set in advance, by tracing back from a time at which the determination is performed. The time at which the amplitude of the seismic wave indicated by the waveform data exceeds the noise level set in advance is the observation start time of the P wave.

The P-wave observation time specifying unit 201 outputs the specified observation start time of the P wave to the waveform acquisition unit 202 and the S-wave observation time estimation unit 206.

Any method may be used as a method in which the P-wave observation time specifying unit 201 specifies the observation start time of the P wave as long as the observation start time of the P wave can be correctly specified.

The waveform acquisition unit 202 acquires the waveform data of the seismic wave detected by the seismograph 101 from the seismic detection device 10. The waveform acquisition unit 202 outputs the acquired waveform data to the P-wave observation time specifying unit 201.

The waveform acquisition unit 202 acquires waveform data for a predetermined period including the observation start time of the P wave detected by the seismograph 101.

Figure 4:
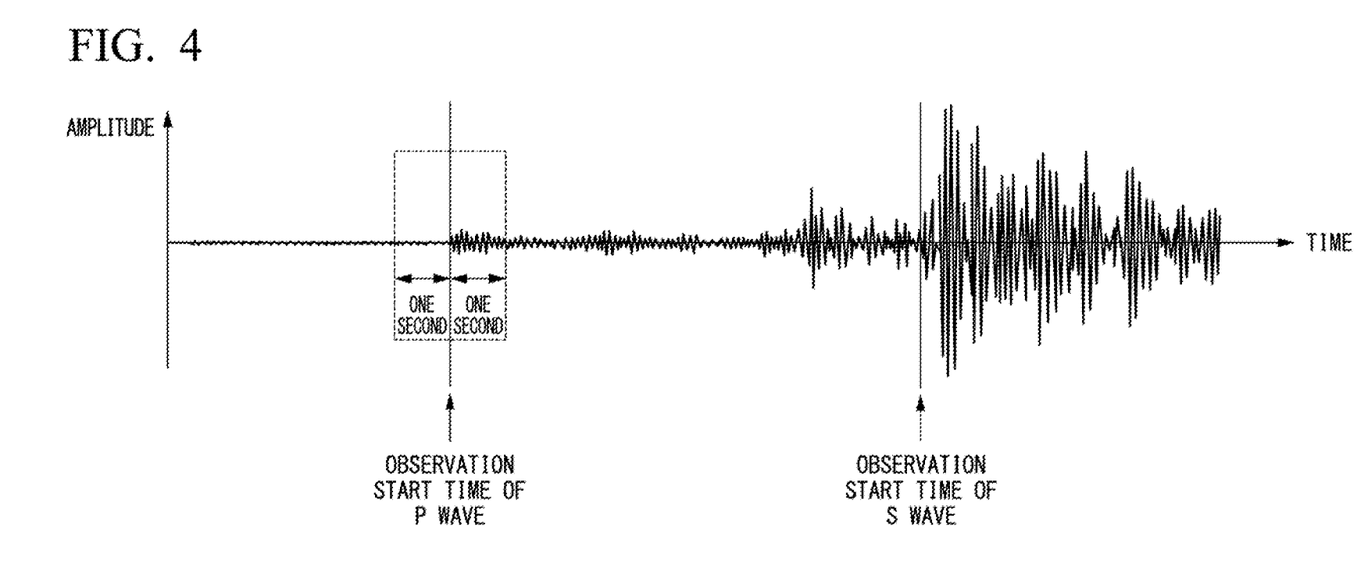
FIG. 4 is a diagram showing an example of a seismic wave detected by a seismograph according to the example embodiment of the present invention.

For example, the predetermined period is one second before and after the observation start time of the P wave, which is specified by the P-wave observation time specifying unit 201 (that is, 2 seconds in total). In this case, the waveform acquisition unit 202 specifies waveform data including waveform data of a seismic wave for one second before and after the observation start time of the P wave, among pieces of waveform data acquired from the seismic detection device 10 as shown in FIG. 4, for example.

The waveform acquisition unit 202 outputs the waveform data including the waveform data of the seismic wave at the observation start time of the P wave to the delay time specifying unit 205.

The model generation unit 203 generates a trained model by performing machine learning of a modeled neural network with a plurality of pieces of learning data. The neural network is, for example, a convolutional neural network including an input layer, an intermediate layer, and an output layer. The learning data here is data in which waveform data for a predetermined period including the observation start time of the P wave is associated with a delay time (an example of an actual delay time) from the observation start time of the P wave to the observation start time of the S wave, which is obtained in advance by analysis or the like, in one-to-one correspondence manner.

For example, the model generation unit 203 classifies a plurality of pieces of learning data into training data, evaluation data, and test data. The model generation unit 203 inputs the waveform data of the training data to the neural network. The neural network outputs the delay time from the observation start time of the P wave to the observation start time of the S wave. Each time the waveform data of the training data is input to the neural network and the delay time from the observation start time of the P wave to the observation start time of the S wave is output from the neural network, the model generation unit 203 changes the weighting of data coupling between nodes (that is, changes the model of the neural network) by performing backpropagation in response to the above output. Then, the model generation unit 203 inputs the waveform data of the evaluation data to the neural network of the model changed by the waveform data of the training data. The neural network outputs the delay time from the observation start time of the P wave to the observation start time of the S wave, in accordance with the waveform data of the input evaluation data. The model generation unit 203 changes the weighting of data coupling between nodes, based on the output of the neural network, if necessary. The neural network generated by the model generation unit 203 in this manner is the trained model. Then, the model generation unit 203 inputs the waveform data of the test data to the neural network of the trained model as a final confirmation. The neural network of the trained model outputs the delay time from the observation start time of the P wave to the observation start time of the S wave, in accordance with the waveform data of the input test data. When, for all pieces of test data, the delay time output by the neural network of the trained model is within a predetermined error range with respect to the delay time from the observation start time of the P wave to the observation start time of the S wave, which is associated with the waveform data of the input test data, the model generation unit 203 determines that the neural network of the trained model is a desired model. Further, when, for even in one of the pieces of test data, the delay time output by the neural network of the trained model is not within the predetermined error range with respect to the delay time from the observation start time of the P wave to the observation start time of the S wave, which is associated with the waveform data of the input test data, the model generation unit 203 generates a trained model by using new learning data.

The generation of the trained model by the model generation unit 203 is repeated until the desired trained model is obtained.

The model generation unit 203 records the generated trained model in the storage unit 209.

The error distribution generation unit 204 generates a distribution of a frequency of an error between the delay time from the observation start time of the P wave to the observation start time of the S wave, which is output by the trained model, and the actual delay time from the observation start time of the P wave to the observation start time of the S wave, based on the neural network of the final trained model and a plurality of pieces of learning data.

Figure 5:
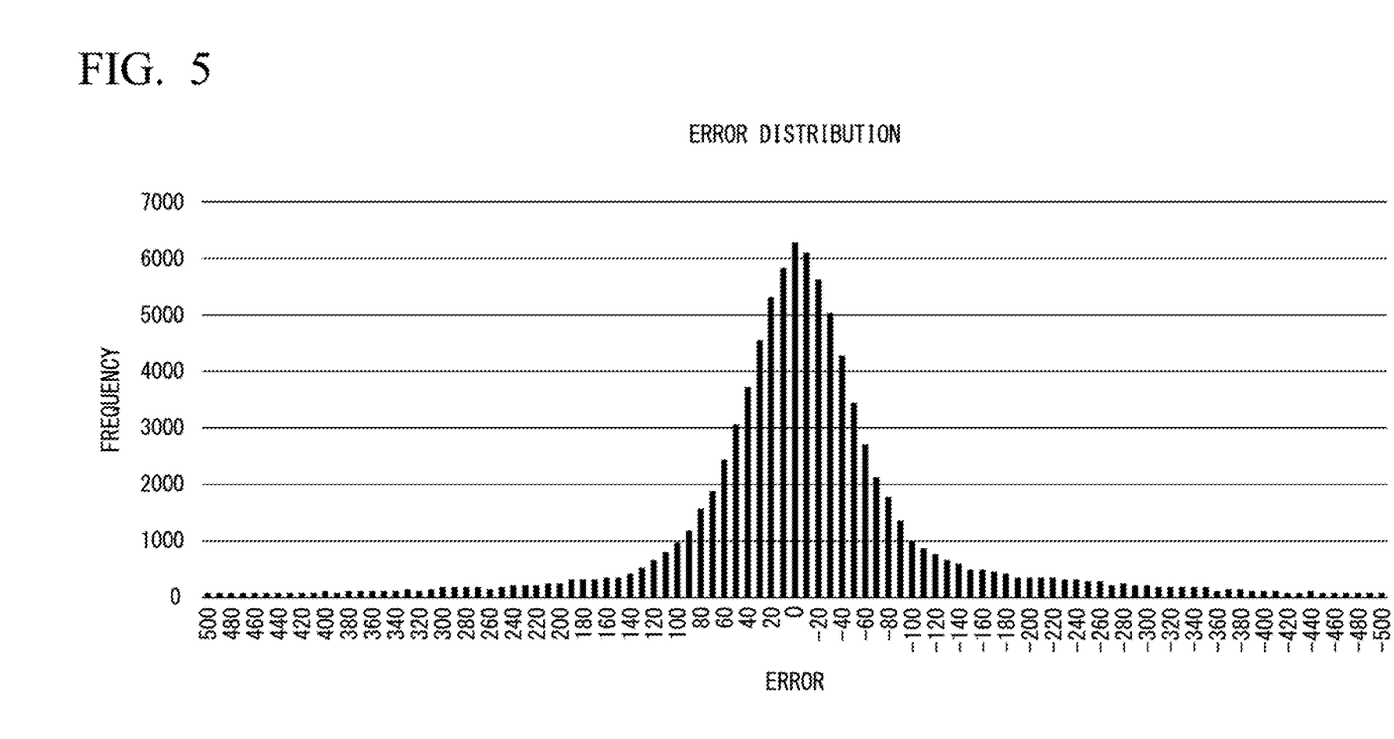
FIG. 5 is a diagram showing an example of an error distribution generated by an error distribution generation unit according to the example embodiment of the present invention.

For example, the error distribution generation unit 204 inputs the waveform data of the learning data to the neural network. The error distribution generation unit 204 acquires the output (delay time) of the neural network in response to the input waveform data. The error distribution generation unit 204 specifies the actual delay time from the observation start time of the P wave to the observation start time of the S wave, which is associated with the waveform data in the learning data. The error distribution generation unit 204 subtracts the acquired output of the neural network from the specified actual delay time, and thereby calculating the error between the delay time from the observation start time of the P wave to the observation start time of the S wave, which is output by the trained model, and the actual delay time from the observation start time of the P wave to the observation start time of the S wave. The error distribution generation unit 204 calculates the error for a plurality of pieces of learning data. The error distribution generation unit 204 calculates a distribution of a frequency of an occurrence of the error between the delay time from the observation start time of the P wave to the observation start time of the S wave, which is output by the trained model, and the actual delay time from the observation start time of the P wave to the observation start time of the S wave, wherein the error is calculated for a plurality of pieces of learning data. The distribution of the frequency of the occurrence of the error between the delay time from the observation start time of the P wave to the observation start time of the S wave, which is output by the trained model, and the actual delay time from the observation start time of the P wave to the observation start time of the S wave, the distribution being generated by the error distribution generation unit 204, is a distribution as shown in FIG. 5, for example. The distribution shown in FIG. 5 is a distribution of the frequency of the occurrence of the error between the delay time from the observation start time of the P wave to the observation start time of the S wave, which is output by the trained model obtained by inputting pieces of waveform data of 25,000 pieces of learning data to the trained model, and the actual delay time from the observation start time of the P wave to the observation start time of the S wave. In FIG. 5, the horizontal axis indicates the time represented by $\frac{1}{100}$ second of one scale, and indicates the error time centering on the error 0. Further, in FIG. 5, the vertical axis indicates the frequency (number of times) in which the time of each error occurs, when the pieces of waveform data of 25,000 pieces of learning data are input to the trained model. In the example of the error distribution shown in FIG. 5, the standard deviation σ is 164.18 (1.6418 seconds).

The error distribution generation unit 204 records the distribution of the frequency of the occurrence of the error between the delay time from the observation start time of the P wave to the observation start time of the S wave, which is output by the trained model, and the actual delay time from the observation start time of the P wave to the observation start time of the S wave, in the storage unit 209.

The delay time specifying unit 205 acquires the waveform data including the waveform data of the seismic wave at the observation start time of the P wave, from the waveform acquisition unit 202.

The delay time specifying unit 205 inputs the waveform data of the seismic wave at the observation start time of the P wave, which is included in the waveform data of the seismic wave acquired from the waveform acquisition unit 202, to the trained model generated by the model generation unit 203. Here, the waveform data of the seismic wave, which is input to the trained model by the delay time specifying unit 205, is the waveform data for one second before and after the observation start time of the P wave, for example.

Further, the delay time specifying unit 205 acquires the delay time from the observation start time of the P wave to the observation start time of the S wave, which is output by the trained model. The delay time specifying unit 205 outputs the acquired delay time from the observation start time of the P wave to the observation start time of the S wave, to the S-wave observation time estimation unit 206.

For example, the position of the seismic center can be specified from a seismic wave observed at one observation point by using the principal component analysis method and the B-Δ method, as disclosed in "Technical reference materials on the outline and processing method of Earthquake Early Warning", [online], December 13, H28, Earthquake and Volcano Department in Japan Meteorological Agency, [Search on July 23, R1], Internet (URL: https://www-.data.jma.go.jp/svd/eew/data/nc/katsuyou/reference.pdf).

PCT International Publication No. WO2018/008708 being the patent document discloses a configuration of implementing the B-Δ method by machine learning.

The above processing performed by the delay time specifying unit 205 is performed based on the B-Δ method and the correlation relation between a distance from the observation point to the seismic center and the delay time from the observation start time of the P wave to the observation start time of the S wave (specifically, the shorter the distance from the observation point to the seismic center, the shorter the delay time, and the longer the distance from the observation point to the seismic center, the longer the delay time).

The S-wave observation time estimation unit 206 estimates the observation start time of the S wave based on the observation start time of the P wave and the delay time from the observation start time of the P wave to the observation start time of the S wave.

For example, the S-wave observation time estimation unit 206 acquires the observation start time of the P wave from the P-wave observation time specifying unit 201. Further, the S-wave observation time estimation unit 206 acquires the delay time from the observation start time of the P wave to the observation start time of the S wave from the delay time specifying unit 205. The S-wave observation time estimation unit 206 estimates, as the observation start time of the S wave, a time obtained by adding the delay time from the observation start time of the P wave to the observation start time of the S wave to the observation start time of the P wave.

The S-wave observation time estimation unit 206 outputs the estimated observation start time of the S wave to the search range determination unit 207. Further, the S-wave observation time estimation unit 206 outputs the estimated observation start time of the S wave to the seismic analysis unit 208.

The search range determination unit 207 determines the search range of the S wave in the waveform data based on: the distribution of the frequency of the occurrence of the error between the delay time from the observation start time of the P wave to the observation start time of the S wave, which is output by the trained model, and the actual delay time from the observation start time of the P wave to the observation start time of the S wave; and the observation start time of the S wave, which is estimated by the S-wave observation time estimation unit 206.

For example, the search range determination unit 207 acquires the observation start time of the S wave, which is estimated by the S-wave observation time estimation unit 206, from the S-wave observation time estimation unit 206. The search range determination unit 207 reads the distribution of the frequency of the occurrence of the error between the delay time from the observation start time of the P wave to the observation start time of the S wave, which is output by the trained model, and the actual delay time from the observation start time of the P wave to the observation start time of the S wave, from the storage unit 209. The search range determination unit 207 determines an error range (for example, a time range of ±2σ) from the distribution of the frequency of the error occurring. Here, σ represents the standard deviation. The search range determination unit 207 determines, as the search range of the S wave in the waveform data, the error range based on the observation start time of the S wave, which is estimated by the S-wave observation time estimation unit 206 (for example, a time range of 2σ before and after the observation start time of the S wave, which is estimated by the S-wave observation time estimation unit 206).

The search range determination unit 207 records the determined search range of the S wave in the storage unit 209.

The seismic analysis unit 208 specifies the observation start time of the S wave in the waveform data based on the observation start time of the S wave, which is estimated by the S-wave observation time estimation unit 206, and the search range of the S wave, which is determined by the search range determination unit 207.

For example, the seismic analysis unit 208 acquires the observation start time of the S wave, which is estimated by the S-wave observation time estimation unit 206, from the S-wave observation time estimation unit 206. Further, the seismic analysis unit 208 acquires the search range of the S wave, which is determined by the search range determination unit 207, from the storage unit 209. The seismic analysis unit 208 specifies the observation start time of the S wave in the waveform data by measuring the S wave based on the observation start time of the S wave, which is estimated by the S-wave observation time estimation unit 206, in the search range of the S wave, which is determined by the search range determination unit 207 (an example of searching for the S wave).

In addition, the seismic analysis unit 208 measures the P wave.

The measurement of the P wave and the S wave, which is performed by the seismic analysis unit 208, may be performed by a measurement technique using an AI, which is disclosed in "[Automatic picking of P and S phases using a neural tree] Journal of Seismology (2006) 10: 39-63", for example.

The storage unit 209 stores various types of information necessary for the processing performed by the seismic observation device 20.

For example, the storage unit 209 stores the distribution of the frequency of the occurrence of the error between the delay time from the observation start time of the P wave to the observation start time of the S wave, which is output by the trained model, and the actual delay time from the observation start time of the P wave to the observation start time of the S wave, the distribution being generated by the error distribution generation unit 204. Further, for example, the storage unit 209 stores the learning data. Further, for example, the storage unit 209 stores the trained model generated by the model generation unit 203. Further, for example, the storage unit 209 stores the search range of the S wave, which is determined by the search range determination unit 207.

Next, processing of estimating the observation start time of the S wave by the seismic observation system 1 will be described.

Figure 6:
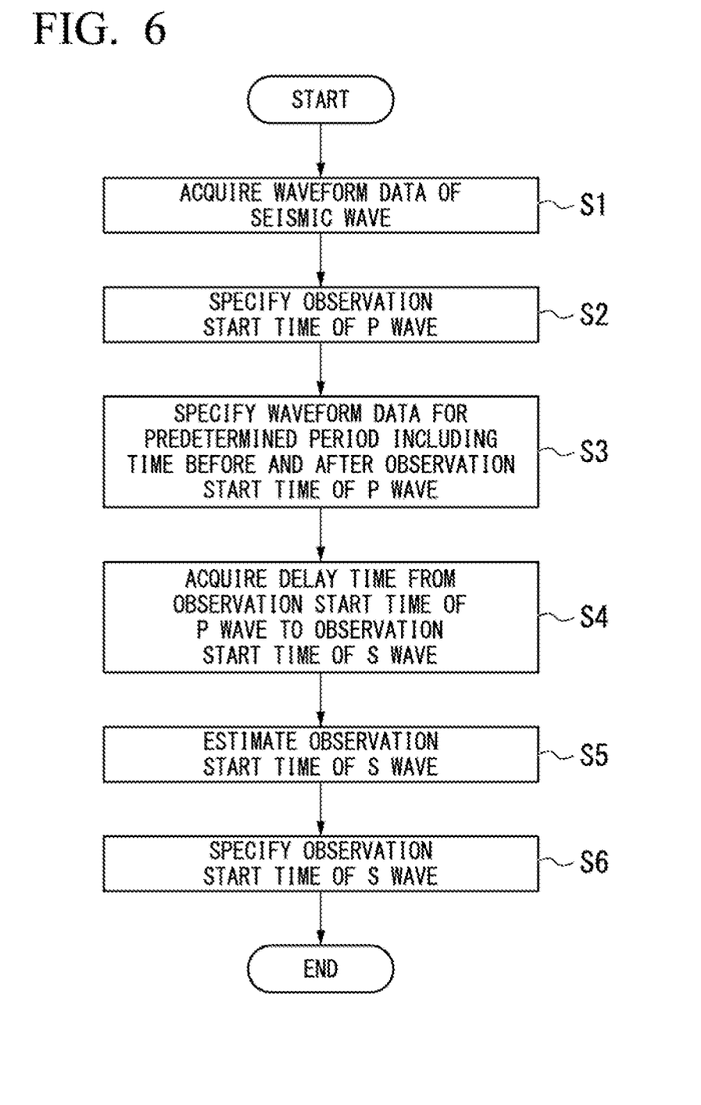
FIG. 6 is a diagram showing an example of a processing flow of the seismic observation device according to the example embodiment of the present invention.

Here, the processing flow of the seismic observation system 1 shown in FIG. 6 will be described.

A case as follows will be described as an example. The model generation unit 203 generates a trained model by using the learning data stored in the storage unit 209, and records the generated learning model in the storage unit 209. Further, the search range determination unit 207 determines the search range of the S wave in the waveform data based on: the distribution of the frequency of the occurrence of the error between the delay time from the observation start time of the P wave to the observation start time of the S wave, which is output by the trained model, and the actual delay time from the observation start time of the P wave to the observation start time of the S wave; and the observation start time of the S wave, which is estimated by the S-wave observation time estimation unit 206. Further, the storage unit 209 stores the search range of the S wave, which is determined by the search range determination unit 207.

The waveform acquisition unit 202 acquires the waveform data of a seismic wave detected by the seismograph 101 from the seismic detection device 10 (Step S1). The waveform acquisition unit 202 outputs the acquired waveform data to the P-wave observation time specifying unit 201.

The P-wave observation time specifying unit 201 acquires waveform data of the seismic wave from the waveform acquisition unit 202. The P-wave observation time specifying unit 201 specifies an observation start time of a P wave by using the acquired waveform data of the seismic wave (Step S2). The P-wave observation time specifying unit 201 outputs the specified observation start time of the P wave to the waveform acquisition unit 202 and the S-wave observation time estimation unit 206.

The waveform acquisition unit 202 acquires the observation start time of the P wave, which is specified by the P-wave observation time specifying unit 201, from the P-wave observation time specifying unit 201. The waveform acquisition unit 202 specifies the waveform data for a predetermined period including the acquired observation start time of the P wave in the waveform data of the seismic wave detected by the seismograph 101 (Step S3). The waveform acquisition unit 202 outputs the waveform data including the waveform data of the seismic wave at the observation start time of the P wave to the delay time specifying unit 205.

The delay time specifying unit 205 acquires the waveform data including the waveform data of the seismic wave at the observation start time of the P wave, from the waveform acquisition unit 202. The delay time specifying unit 205 inputs the waveform data of the seismic wave at the observation start time of the P wave, which is included in the acquired waveform data of the seismic wave, to the trained model generated by the model generation unit 203. The delay time specifying unit 205 acquires the delay time from the observation start time of the P wave to the observation start time of the S wave, which is output by the trained model (Step S4). The delay time specifying unit 205 outputs the acquired delay time from the observation start time of the P wave to the observation start time of the S wave, to the S-wave observation time estimation unit 206.

The S-wave observation time estimation unit 206 acquires the observation start time of the P wave, which is specified by the P-wave observation time specifying unit 201, from the P-wave observation time specifying unit 201. Further, the S-wave observation time estimation unit 206 acquires the delay time from the observation start time of the P wave to the observation start time of the S wave from the delay time specifying unit 205. The S-wave observation time estimation unit 206 estimates the observation start time of the S wave based on the observation start time of the P wave and the delay time from the observation start time of the P wave to the observation start time of the S wave (Step S5). The S-wave observation time estimation unit 206 outputs the estimated observation start time of the S wave to the seismic analysis unit 208.

The seismic analysis unit 208 acquires the observation start time of the S wave, which is estimated by the S-wave observation time estimation unit 206, from the S-wave observation time estimation unit 206. Further, the seismic analysis unit 208 acquires the search range of the S wave, which is determined by the search range determination unit 207, from the storage unit 209. The seismic analysis unit 208 specifies the observation start time of the S wave by measuring the S wave, in the time range based on the acquired observation start time of the S wave and the acquired search range of the S wave (Step S6).

In addition, the seismic analysis unit 208 measures the P wave. The seismic analysis unit 208 outputs measurement data obtained by measuring the P wave and the S wave, to the seismic analysis device 30.

The seismic analysis device 30 acquires the measurement data measured by the seismic analysis unit 208, from the seismic observation device 20. The seismic analysis device 30 analyzes an earthquake by using the acquired measurement data.

The seismic observation system 1 according to the example embodiment of the present invention has been described above.

In the seismic observation device 20 in the seismic observation system 1, the waveform acquisition unit 202 acquires waveform data for a predetermined period including the observation start time of the P wave. The delay time specifying unit 205 inputs the waveform data to the trained model and acquires the delay time from the observation start time of the P wave to the observation start time of the S wave, from the trained model. The S-wave observation time estimation unit (an example of the observation time estimation unit) 206 estimates the observation start time of the S wave based on the observation start time of the P wave and the delay time.

In this manner, the seismic observation system 1 can estimate the observation start time of the S wave from the P wave at a time at which the S wave is not generated. As a result, the seismic observation system 1 can quickly specify the observation start time of the S wave.

A configuration of a seismic observation device 20 according to another example embodiment of the present invention will be described.

Figure 7:
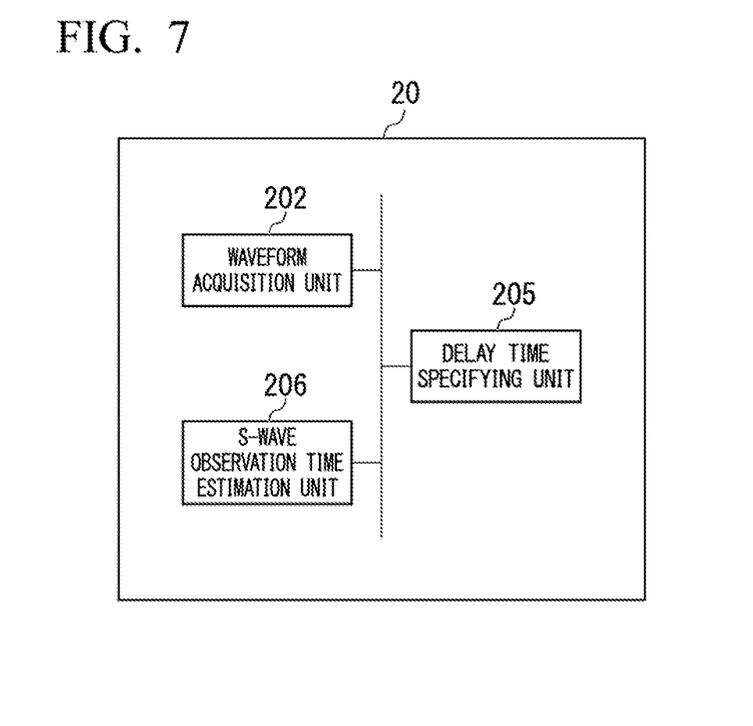
FIG. 7 is a diagram showing a configuration of a seismic observation device according to another example embodiment of the present invention.

As shown in FIG. 7, the seismic observation device 20 according to the present example embodiment includes a waveform acquisition unit 202, a delay time specifying unit 205, and an S-wave observation time estimation unit (observation time estimation unit) 206.

The waveform acquisition unit 202 acquires waveform data for a predetermined period including an observation start time of a P wave.

The delay time specifying unit 205 inputs the waveform data to a trained model and acquires a delay time from the observation start time of the P wave to an observation start time of an S wave, from the trained model.

The S-wave observation time estimation unit (the observation time estimation unit) 206 estimates the observation start time of the S wave based on the observation start time of the P wave and the delay time.

The storage unit, other storage devices, and the like in the example embodiments of the present invention may be provided anywhere as long as information can be appropriately transmitted and received. Further, a plurality of storage units, other storage devices, and the like may be provided within a range in which information can be appropriately transmitted and received, and data may be distributed and stored in such storage units, storage devices, and the like.

In the processing in the example embodiments of the present invention, the order of steps may be changed as long as the appropriate steps are performed.

In the one example embodiment of the present invention, an example has been described in which the seismic observation device 20 includes the search range determination unit 207, and the search range determination unit 207 determines the search range of the S wave in waveform data based on: the distribution of the frequency of the occurrence of the error between the delay time from the observation start time of the P wave to the observation start time of the S wave, which is output by the trained model, and the actual delay time from the observation start time of the P wave to the observation start time of the S wave; and the observation start time of the S wave, which is estimated by the S-wave observation time estimation unit 206.

However, in another example embodiment of the present invention, the learning model may include a model for determining the search range of the S wave in the waveform data, and the model generation unit 203 may generate a trained model including the model for determining the search range of the S wave in the waveform data by using the learning data.

In one example embodiment of the present invention, a case where the model generation unit 203 generates the trained model as software and stores it in the storage unit 209 has been described.

However, in another example embodiment of the invention, the trained model may be implemented as hardware.

For example, the model generation unit 203 may write a configuration program for implementing the processing performed by the trained model stored in the storage unit 209, into programmable hardware such as a FPGA (Field-Programmable Gate Array).

Although the example embodiments of the present invention have been described, the seismic observation system 1, the seismic detection device 10, the seismic observation device 20, the seismic analysis device 30, and other control devices described above may include a computer device therein. The process of the above-described processing is stored in a computer-readable recording medium in the form of a program, and the above processing is performed by the computer reading and executing this program. A specific example of the computer will be described below.

Figure 8:
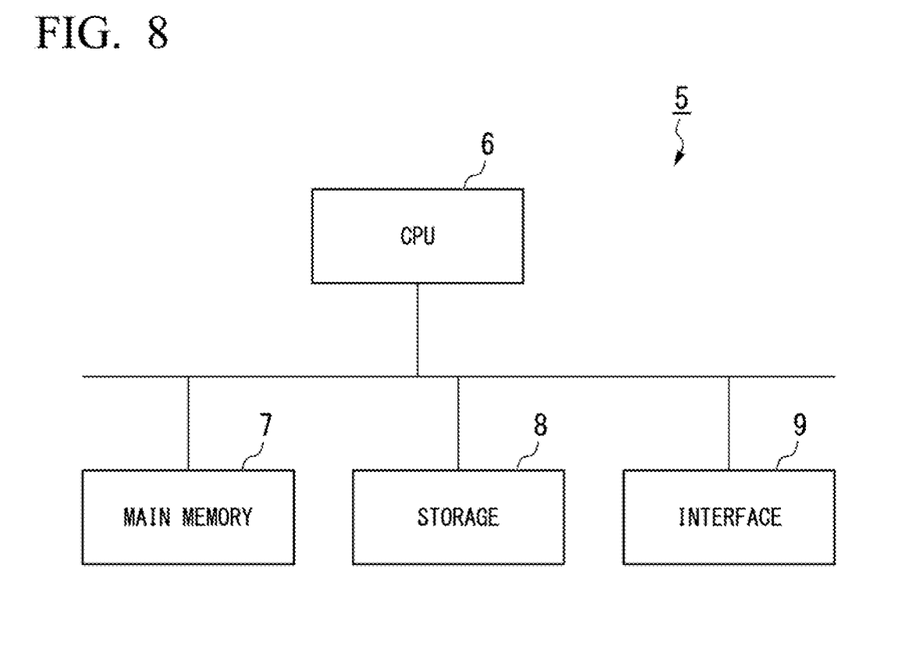
FIG. 8 is a schematic block diagram showing a configuration of a computer according to at least one example embodiment.

FIG. 8 is a schematic block diagram showing a configuration of a computer according to at least one example embodiment.

As shown in FIG. 8, a computer 5 includes a CPU 6, a main memory 7, a storage 8, and an interface 9.

For example, each of the seismic observation system 1, the seismic detection device 10, the seismic observation device 20, the seismic analysis device 30, and other control devices described above is mounted on the computer 5. The operation of each processing unit described above is stored in the storage 8 in the form of a program. The CPU 6 reads a program from the storage 8, loads the program into the main memory 7, and performs the above processing in accordance with the program. The CPU 6 secures a storage area corresponding to each storage unit described above in the main memory 7, in accordance with the program.

As the storage 8, a HDD (Hard Disk Drive), an SSD (Solid State Drive), a magnetic disk, an optical magnetic disk, a CD-ROM (Compact Disc Read Only Memory), a DVD-ROM (Digital Versatile Disc Read Only Memory), a semiconductor memory, and the like are exemplary examples. The storage 8 may be an internal medium which is directly connected to a bus of the computer 5, or may be an external medium which is connected to the computer 5 through the interface 9 or a communication line. When this program is transmitted to the computer 5 via the communication line, the computer 5 that receives the transmitted program may load the program into the main memory 7 and perform the above processing. In at least one example embodiment, the storage 8 is a non-transitory tangible recording medium.

Further, the above program may implement some of the above-described functions. Furthermore, the program may be a file that can implement the above-described functions in combination with a program already recorded in a computer device, that is, a so-called difference file (difference program).

Although some example embodiments of the present invention have been described, the example embodiments are examples and do not limit the scope of the invention. Various additions, omissions, replacements, and changes may be made to the example embodiments without departing from the gist of the invention.

This application is based upon and claims the benefit of priority from Japanese patent application No. 2019-150624 filed on Aug. 20, 2019, the disclosure of which is incorporated herein in its entirety by reference.

INDUSTRIAL APPLICABILITY

The present invention may be applied to a seismic observation device, a seismic observation method, and a recording medium.

DESCRIPTION OF REFERENCE SYMBOLS

1: Seismic observation system
5: Computer
6: CPU
7: Main memory
8: Storage
9: Interface
10: Seismic detection device
20: Seismic observation device
30: Seismic analysis device
101: Seismograph
102: Communication unit (communication means)
201: P-wave observation time specifying unit (P-wave observation time specifying means)
202: Waveform acquisition unit (waveform acquisition means)
203: Model generation unit (model generation means)
204: Error distribution generation unit (error distribution generation means)
205: Delay time specifying unit (delay time specifying means)
206: S-wave observation time estimation unit (observation time estimation unit, observation time estimation means)
207: Search range determination unit (search range determination means)
208: Seismic analysis unit (seismic analysis means)
209: Storage unit (storage means)

What is claimed is:
1. A seismic observation device comprising:
at least one memory configured to store instructions; and
at least one processor configured to execute the instructions to:
acquire waveform data for a predetermined period including an observation start time of a P wave;
input the waveform data to a trained model and acquiring, acquire, from the trained model, a delay time from the observation start time of the P wave to an observation start time of an S wave; and estimate an observation start time of an S wave corresponding to the acquired observation start time of the P wave based on the observation start time of the P wave and the delay time.

2. The seismic observation device according to claim 1, wherein the at least one processor is configured to execute the instructions to:

determine a search range of the S wave in the waveform data based on: a distribution of a frequency of an error between the delay time output by the trained model and an actual delay time; and the estimated observation start time of the S wave; and specify the observation start time of the S wave by searching for the S wave in the search range.

3. A seismic observation method comprising:

acquiring waveform data for a predetermined period including an observation start time of a P wave;

inputting the waveform data to a trained model and acquiring, from the trained model, a delay time from the observation start time of the P wave to an observation start time of an S wave; and estimating an observation start time of an S wave corresponding to the acquired observation start time of the P wave based on the observation start time of the P wave and the delay time.

4. A non-transitory recording medium storing a program for causing a computer to execute:

acquiring waveform data for a predetermined period including an observation start time of a P wave;

inputting the waveform data to a trained model and acquiring, from the trained model, a delay time from the observation start time of the P wave to an observation start time of an S wave; and estimating an observation start time of an S wave corresponding to the acquired observation start time of the P wave based on the observation start time of the P wave and the delay time.

* * * * *